United States Patent [19]

Kovacs

[11] Patent Number: 5,301,793
[45] Date of Patent: Apr. 12, 1994

[54] CONTINUOUS MOTION UPENDER

[75] Inventor: lloyd Kovacs, Sheboygan, Wis.

[73] Assignee: Hayssen Manufacturing Company, Sheboygan, Wis.

[21] Appl. No.: 969,752

[22] Filed: Oct. 30, 1992

[51] Int. Cl.$^5$ .......................................... B65G 47/24
[52] U.S. Cl. ................................................. 198/415
[58] Field of Search ............... 198/415, 324; 414/418, 414/425

[56] References Cited

U.S. PATENT DOCUMENTS

| | | | |
|---|---|---|---|
| 2,508,368 | 5/1950 | Borkmann | 198/415 |
| 3,312,326 | 4/1967 | Huppenthal | 198/415 |
| 4,164,996 | 8/1979 | Tomlinson | 198/415 |

Primary Examiner—Joseph E. Valenza
Attorney, Agent, or Firm—Lee, Mann, Smith, McWilliams, Sweeney & Ohlson

[57] ABSTRACT

An apparatus and method for upending an item from a prone-orientation to an upright orientation. Two interconnected conveyors are employed, a first lower conveyor and a second upending conveyor. The lower conveyor includes a series of slats which may be raised to engage one end of an item to be upended. The second conveyor includes a series of spaced rods located to engage the opposite end of the item to be upended. When an item is engaged between a raised slat and a rod, the distance between the slat and rod is retained essentially constant and the rod is raised relative to the slat to upend the item from the prone orientation to an upright orientation.

31 Claims, 4 Drawing Sheets

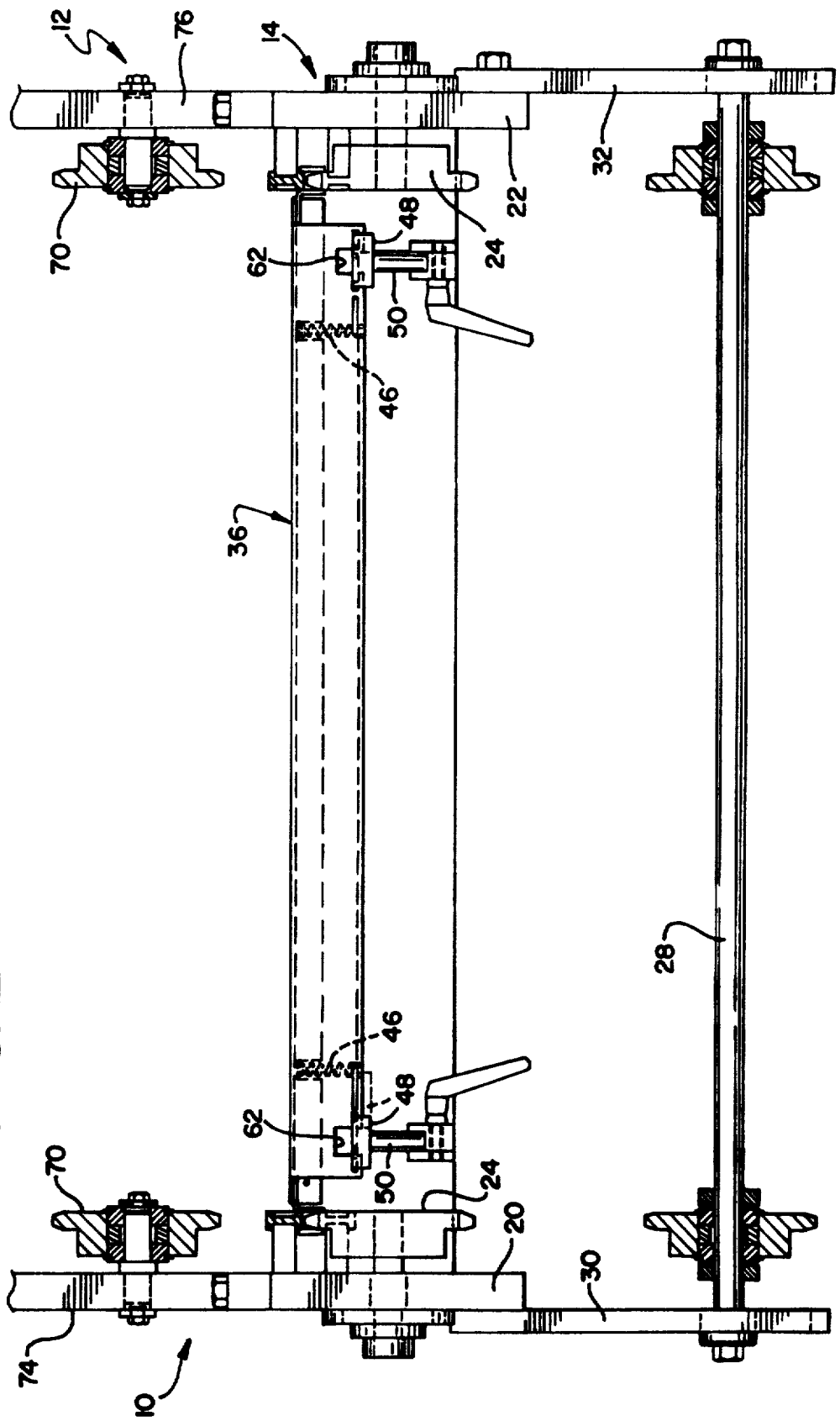

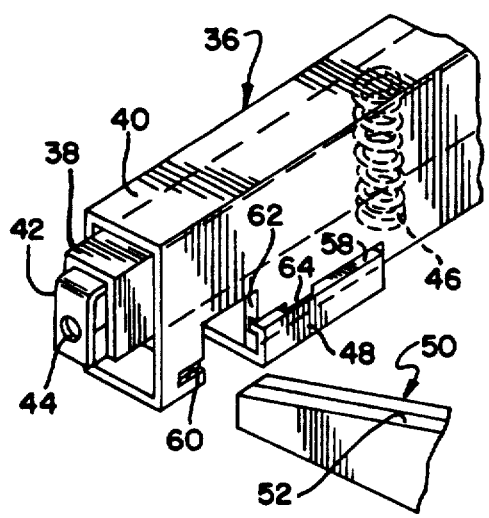
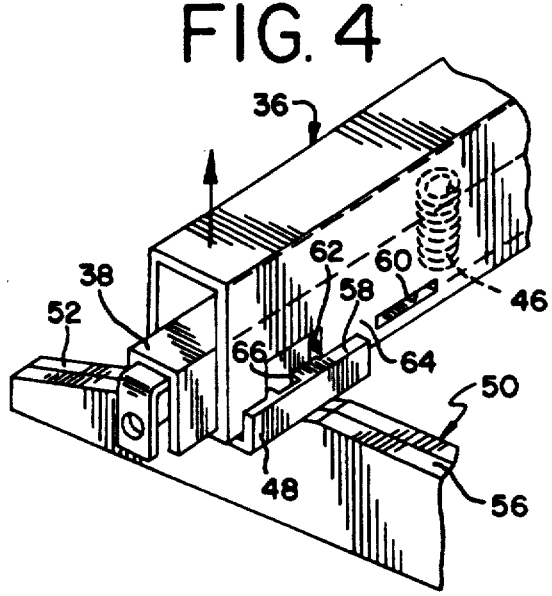
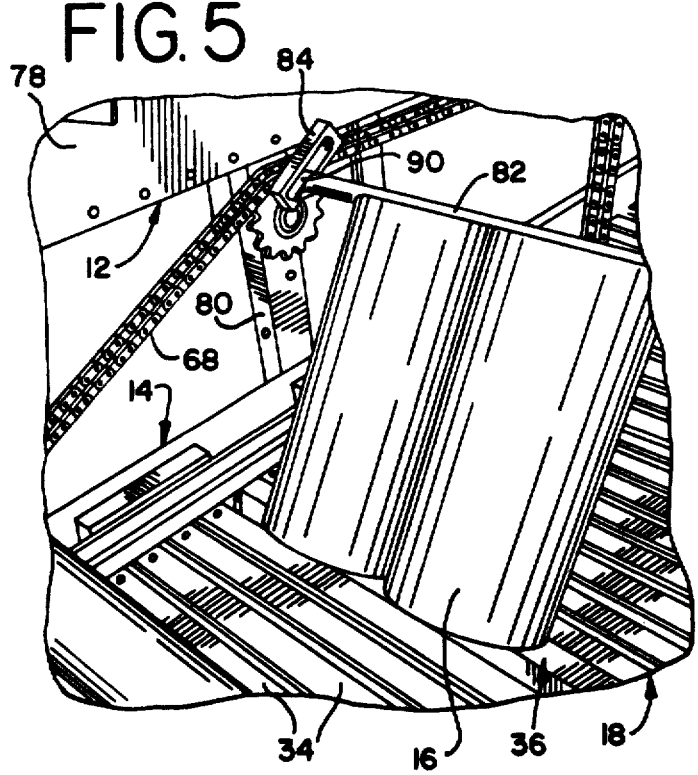
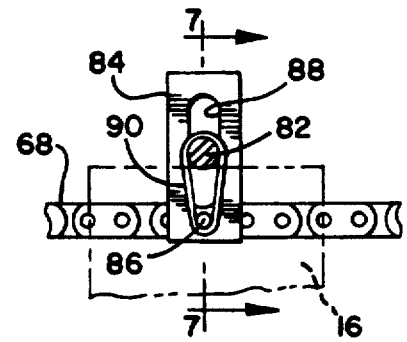
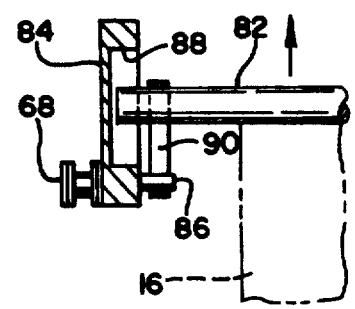

CONTINUOUS MOTION UPENDER

BACKGROUND OF THE INVENTION

This invention relates to a method and apparatus for upending an item from a prone orientation to an upright orientation, and in particular to an apparatus for continuously upending items of a similar axial length at extremely high speeds and efficiencies, while being readily adjustable to accommodate a large range of different sizes of items to be upended.

In modern packaging machinery, it is often required to upend items from a prone orientation to an upright orientation during the packaging process. Usually upending occurs prior to collating a group of items for further packaging, such as packaging in a container, wrapping the collated items in a plastic film, or otherwise collecting or collating a group of upended items.

Many different types of apparatus have been used in the past for upending. Perhaps the simplest has been a conveyor belt having two levels, where a package will fall from one level to another, and in doing so, be upended due to a combination of the geometry of the belts and gravity. However, such an apparatus requires a very stable package when upended, and tall bottles, rolls o the like cannot readily be upended at high speeds with consistency.

Another type of upender used has been a powered "water wheel", comprising a rotary wheel having a series of slots, each of which accepts an item in the prone orientation at the top of the wheel, and after rotation of the wheel through approximately 90°, sets the now-upended item on a conveyor for downstream handling.

All prior apparatus for upending have suffered common disadvantages. Such apparatus is generally a single purpose apparatus, for only one size of package. In the event that a package size change can be accomplished by the apparatus, such change usually requires either the change of a part (such as a new water wheel), or considerable adjustment of parts. Even when adjustments have been possible, the size range of adjustments has been quite small. Finally, generally only one package at a time can be upended due to the geometry of the upending device.

The present invention provides a significant improvement over all prior art upending devices. Not only is the invention a continuous motion device, but also it is able to accommodate a very wide range of sizes of items, and adjustment is accomplished readily by the adjustment of few parts. Furthermore, more than one item may be upended simultaneously, with the number of items being upended limited only by the size of the items in relation to the width of the apparatus of the invention. The invention also accommodates minor variations in package length effectively and without failure, all at extremely high speeds and efficiencies.

SUMMARY OF THE INVENTION

The invention pertains to an apparatus for conveying and upending an item from a prone orientation to an upright orientation. First means is provided for engaging an upstream end of the item at a first location, the first engaging means being carried by a first conveyor which travels at a first velocity. Second means is provided opposing the first means for engaging a downstream end of the item at a second location, with the second engaging means being carried by a second conveyor traveling at a second velocity, and with the first and second locations being spaced a predetermined distance when the item is first engaged. Means is provided for driving the conveyors in a timed relationship, and means is provided for raising the second location relative to the first location as the conveyors are driven while retaining the locations at the predetermined distance so that the item is upended between the first and second engaging means to an upright orientation.

In accordance with the preferred form of the invention, the first engaging means comprises at least one lateral slat in the first conveyor. Means is provided for raising the slat, that means comprising a cam follower carried by the slat and a fixed cam which is traversed by the cam follower. In accordance with the preferred form of the invention, the cam comprises an elongated cam track, and the cam follower comprises a slide secured to the slat.

To increase the package size range of the apparatus, means is provided for inhibiting engagement of the cam follower on the cam to prevent raising of a slat. An indentation is located in the slat in registration with the fixed cam, and the slide is located in a normal position which is orientated to bridge the indentation. In order to inhibit engagement of the cam follower, the slide is mounted for lateral translation to a withdrawn position to expose the indentation. In accordance with the disclosed form of the invention, for lateral translation the slide includes a flange which engages a lateral groove in the slat, and means can be provided for temporarily holding the slide in both the normal position bridging the indentation, and in the withdrawn position exposing the indentation.

Means is provided for biasing each slat in an unraised orientation. Each slat includes a fixed portion and an elevating portion, and the biasing means comprises at least one compression spring bearing between the fixed and elevating portions of the slat.

In accordance with the preferred form of the invention, the second engaging means comprises a lateral rod. Means is provided for flexibly mounting the rod in the second conveyor, that means comprising a housing secured to the second conveyor for each end of a rod in order to accommodate minor differences in package length and/or minor misadjustments of the apparatus. Each housing has a elongated slot formed therein and engaging a rod end, and includes a flexible pressure means for biasing the rod end in the slot in the direction of the item.

In accordance with the disclosed form of the invention, the means for raising the second location comprises mounting of at least a portion of the second conveyor at an angle relative to the first conveyor so that separation between the conveyors increases in a downstream direction. Means is provided for changing that angle so that items of varying lengths can be upended in the invention.

In the process according to the invention, the item or items to be upended are introduced to the apparatus on the first conveyor which is traveling at the first velocity. The items are engaged by the lateral slat at their upstream ends, and are then engaged by a lateral rod of the second conveyor at their downstream ends while being conveyed at the first velocity. Immediately, the position of the lateral rod is raised by the second conveyor with the distance between the rod and the slat remaining substantially equal in order to retain the items. Once the rod is raised sufficiently and the items are upright, the slat is lowered to release the items, and the items are conveyed from the apparatus for downstream handling.

BRIEF DESCRIPTION OF THE DRAWINGS

The invention is described in further detail in the following description of an example embodying the best mode of the invention, taken in conjunction with the drawing figures, in which:

FIG. 2 is an end illustration generally from the left end of FIG. 1, enlarged and partially in cross section, with portions removed to illustrate detail;

FIG. 3 is a perspective view of a portion of one of the lateral cross slats according to the invention, showing the slat in relation to a portion of a fixed cam and illustrating a cam follower slide in a withdrawn position;

FIG. 4 is a perspective view similar to FIG. 3, but with the cam follower slide in a normal position, and showing the slide engaging the cam and substantially completing lifting of the slat;

FIG. 5 is a perspective illustration of a portion of the apparatus, about in the middle of FIG. 1, showing two rolls that have been raised almost to vertical;

FIG. 6 is an enlarged elevational view of the housing which accommodates the top lateral rod of the invention; and FIG. 7 is a cross-sectional view taken along lines 7—7 of FIG. 6.

DESCRIPTION OF AN EXAMPLE EMBODYING THE BEST MODE OF THE INVENTION

Figure 1:
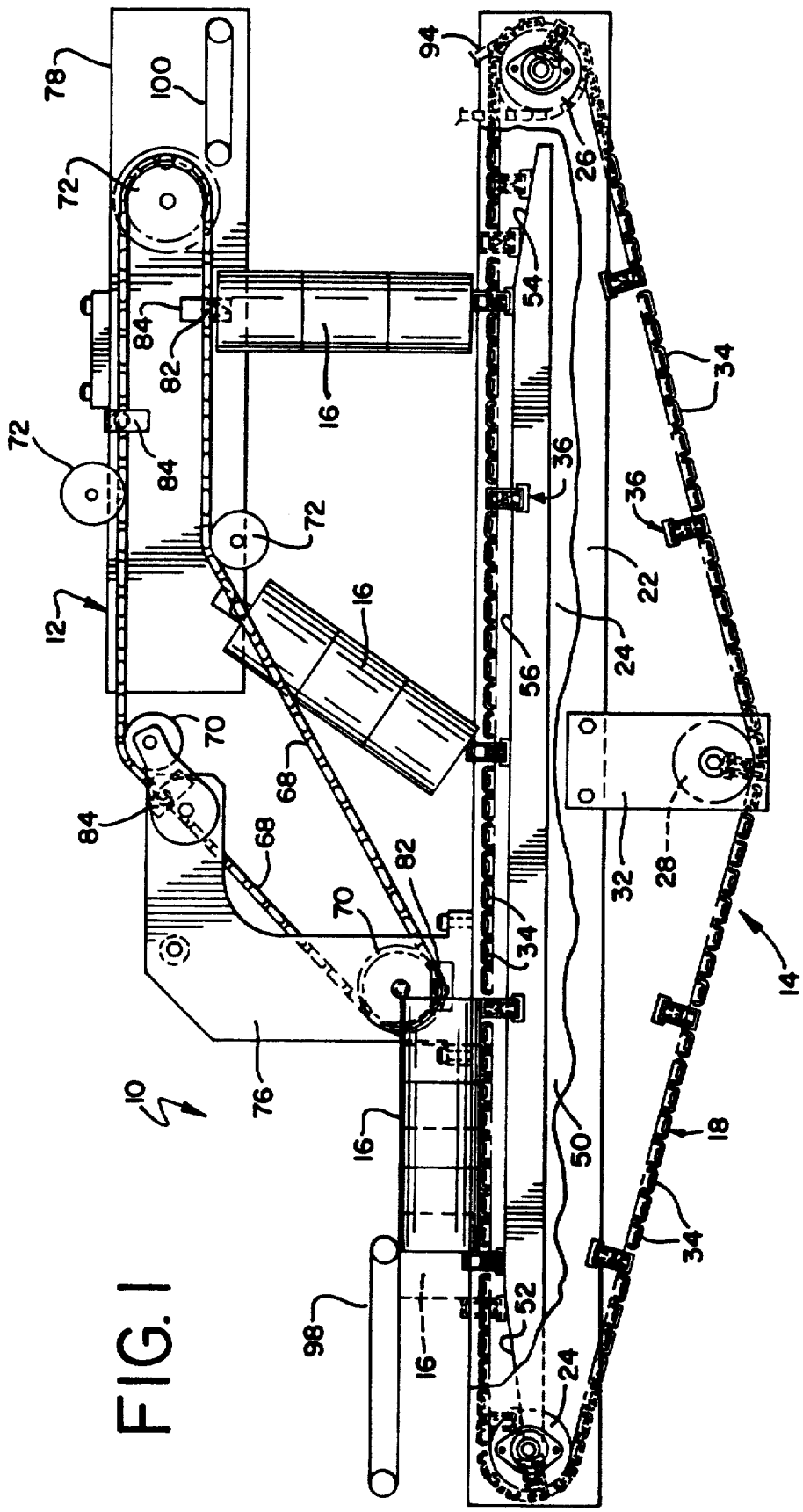
FIG. 1 is a side-elevational illustration of the apparatus according to the invention, with portions being cut away to show detail.

A continuous motion upender according to the invention is shown generally at 10 in the drawing figures. The upender 10 comprises two basic portions, an upper conveyor assembly 12 and a lower conveyor assembly 14. The assemblies 12 and 14 are driven in concert in a timed relationship to raise items 16 from a prone to an upright orientation, as explained in greater detail below. While the invention is described in relation to upending packages of toilet paper, rolls or other such items, it will be evident that the invention can be used to upend many different types of products which must be reoriented 90°, from a generally prone orientation to a generally upright orientation.

Figure 1A:
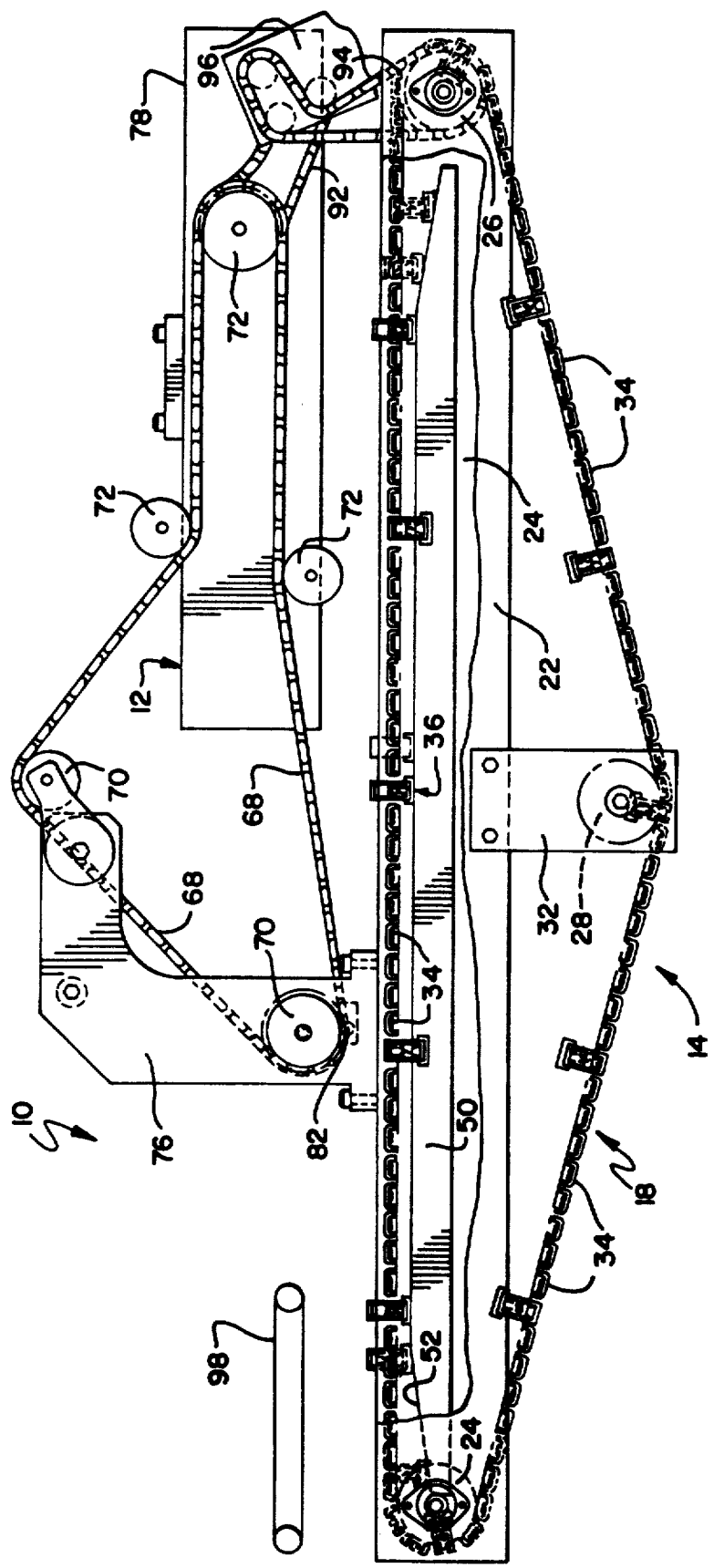
FIG. 1A is a view similar to FIG. 1, but with an elevating framework having been lowered to accommodate items of lesser height, illustrating the driving interconnection of the upper and lower conveyors, and with some additional portions removed to show detail.

The lower conveyor assembly 14 as best shown in FIGS. 1 and 1A includes a first conveyor 18 mounted between fixed frame members 20 and 22. The frame members 20 and 22 are essentially mirror images of one another, and carry the necessary sprockets about which the conveyor 18 is driven. The conveyor 18 passes over opposite sprocket assemblies 24 and 26 located at opposite ends of the frame members 20 and 22, and also passes over a sprocket assembly 28 which extends between a pair of extensions 30 and 32 secured to the respective frame members 20 and 22. The conveyor 18 is driven by a motor (not illustrated) driving one of the sprockets of the sprocket assemblies 24 and 26, or driving the sprocket assembly 28.

The conveyor 18 is comprised of a series of cross slats 34 carried by opposite endless chains (not illustrated in detail) which are engaged on the sprockets of the assemblies 24 through 28. The slats 34 and chains carrying the slats 34 may be parts of a conventional slat conveyor. The conveyor 18, however, also includes a series of spaced lateral slats 36 which are quite unconventional, and which are used to engage an upstream end of an item 16 at a first location for the upending process.

The lateral slats 36, which are best shown in FIGS. 2 through 4, comprise two portions, a fixed portion 38 and a box-like elevating portion 40. The fixed portion 38 extends through the elevating portion 40, and includes opposite ears 42 at either end which are secured to the chain of the conveyor 18. As shown in FIGS. 3 and 4, which illustrate only one end of a lateral slat (the opposite end being a mirror image), each ear includes a central aperture 44 which may be appropriately secured to a chain link of the conveyor 18.

The elevating portion 40 is box-like throughout its length, and extends coextensively with the fixed portion 38, halting just short of the ends of the fixed portion 38 so that the elevating portion 40 can be raised without interfering with the side supporting structure for the conveyor 18. The elevating portion 40 is biased in an unraised orientation shown in FIG. 3. Compression springs 46, bearing between the underside of the fixed portion 38 and the bottom of the elevating portion 40, retain the elevating portion in the unraised orientation.

Each lateral slat 36 includes a pair of cam followers or slides 48 which, in a normal position, bear upon and are in registration with opposite fixed cam tracks 50 which are appropriately secured between the frame members 20 and 22. As best shown in FIG. 1, each of the cam tracks 50 includes opposite inclined ends 52 and 54, and a flat portion 56, which are traversed by the cam followers 48.

Each cam follower 48 includes opposite flanges 58 (only one side shown) engaging lateral grooves 60 formed in opposite sides of the elevating portion 40. The elevating portion 40 also includes an indentation 62 at each end thereof formed in registration with the cam tracks 50. A stop 64 is formed in each groove 60, and the cam follower includes a notch 66 to engage the stop 64.

The cam follower 48 can be oriented in one of two positions, as shown in FIGS. 3 and 4. In the normal position shown in FIG. 4, the cam follower 48 bridges the indentation 62, and is retained in the groove 60, butting against the stop 64. In this normal orientation, the cam follower 48 is in alignment with the cam track 50, and therefore bears on the cam track 50 to raise the elevating portion 40 of each lateral slat 36 as the conveyor 18 revolves. As shown in FIG. 3, however, the cam follower 48 may be laterally translated to a withdrawn position to expose the indentation 62. In this position, the notch 66 engages the stop 64, firmly holding the cam follower 48 in the withdrawn position, and the indentation 62 is in alignment with the cam track 50. The indentation 62 is formed sufficiently deeply into the elevating portion 40 so that the elevating portion does not engage the cam 50, and therefore the elevating portion 40, due to the force of the springs 46 remains in a non-elevated orientation. Every other lateral slat 36 is shown in the non-elevated position along the cam track 50 in FIG. 1.

The upper conveyor assembly 12 comprises a pair of spaced chains 68 passing over a series of sprockets 70 and 72. The sprockets 70 are mounted on opposite fixed arms 74 and 76 extending upwardly from the frame members 20 and 22. The sprockets 72, on the other hand, are mounted in an elevating framework 78 which may be raised or lowered along opposite vertical side rails 80 (FIG. 5) extending upwardly from opposite sides of the conveyor 18. Thus, as shown in FIG. 1A, the framework 78 can be lowered when desired to accommodate items 16 of different longitudinal dimensions.

A series of spaced lateral rods 82 are secured between the chains 68, and the rods 82 and chains 68 form an upper or second conveyor carried by the upper conveyor assembly 12.

As best shown in FIGS. 5 through 7, at least some of the rods 82 are flexibly mounted between the chains 68 within opposite housings 84. Each housing 84 includes a pivot pin 86 extending therethrough and which may be one of the connecting link pins of the chain 68. The rod 82 extends into an elongated slot 88 formed in each housing 84, and an flexible pressure link 90 extends over the rod 82 and about the pivot pin 86 to bias the rod 82 downwardly (in relation to FIGS. 5 through 7) in the slot 88. Thus, the rods 82 are resiliently held in place and, in combination with the raised slats 36, accommodate not only variations in length of succeeding items 16, but also help resiliently clamp the items 16 in place during the upending process, as described in greater detail below.

The conveyors of the upper conveyor assembly 12 and the lower conveyor assembly 14 are driven in timed relationship, although not necessarily at the same velocities. As shown in FIG. 1A, the chains 68 are drivingly interconnected with the lower conveyor 18 by means of a pair of chains 92 and 94. The chains 92 and 94 are interconnected on a sprocket arm 96. The two chains 92 and 94, in combination with pivotal movement of the sprocket arm 96, accommodate the vertical changes of the elevating framework 78, while always drivingly and directly interconnecting the conveyors of the upper conveyor assembly 12 and the lower conveyor assembly 14.

Although not shown in detail in FIGS. 1 and 1A, it will be evident that sprocket ratios between the upper and lower conveyor assemblies 12 and 14 can differ so that the conveyors of the conveyor assemblies are driven at different velocities. For example, the interconnection between the two chains 92 and 94 may be via different diameter sprockets, one of which engages the chain 92 and the other of which engages the chain 94. Therefore, different ratios, resulting in different velocities of the conveyors, can readily be accommodated in a conventional fashion.

For stability of the items 16 being upended, the upender 10 also includes an upper inlet belt 98 and an upper outlet belt 100. The belts 98 and 100 are driven at the same velocity as the conveyor 18 (means not illustrated), in a conventional fashion.

As explained above, the velocities of the conveyors of the upper and lower conveyor assemblies 12 and 14 need not be identical, and preferably, the conveyor 18 is driven at a greater velocity. However, it is important that when an item 16 is engaged between a raised lateral slat 36 and a lateral rod 82 the distance between the rod 82 and the slat 36 remain essentially the same so that the item 16 is held firmly in place, but is not crushed. Thus, it will be evident to one skilled in the art that depending on the relative velocities of the conveyors of the upper conveyor assembly 12 and the lower conveyor assembly 14 once an item 16 is clamped, the upending process must begin immediately, and the geometrical relationship between the upper and lower conveyors, given the relative velocities of the conveyors, must be such that the just-mentioned distance remains the same.

In operation, one or more item 16 is introduced onto the lower conveyor 18 from the left in relation to FIG. 1. The item is engaged between the upper inlet belt 98 and the conveyor 18, and is translated to the right. Timing of introduction of an item 16 into the upender 10 may be conventional such that an upstream end of the item 16 is always in alignment with, and just downstream of, one of the lateral slats 36.

As the item 16 progresses, the cam followers 48 engage the inclined end 52 of the cam tracks 50, and raise the elevating portion 40 upwardly, as best shown in FIG. 5. The item 16 then encounters at its downstream end one of the lateral rods 82 carried between the chains 68. At that instant, the chains 68 begin to extend upwardly at an angle relative to the conveyor 18, and the speeds of the upper and lower conveyors are maintained in combination with the angular change so that the distance between the lateral rod 82 and the raised lateral slat 36 remains essentially the same. Variations in that distance, however, can be accommodated to the extent of the length of the elongated slots 82 of the housings 84.

As shown in FIG. 1, the chains 68 rise at an angle relative to the conveyor 18 such that separation between the upper and lower conveyors increases in the downstream direction until the chains 68 pass over first sprockets 72 of the elevating framework 78. At that orientation, although the items 16 are not fully upended, the items remain clamped and are conveyed further to the right while the remaining upending is accomplished. Again, any variation in spacing between the rod 82 and the lateral slat 36 is accommodated by the spring loading provided by the flexible pressure links 90 and elongated slots 88.

When the item 16 is fully upright, the cam followers 48 begin traversing the downwardly inclined ends 54 of the cam tracks 50. This allows the lateral slot 36 to move downwardly until it is in alignment with adjacent slots 34 and releases and lowers the item 16. The item 16 is then sandwiched between the upper outlet belt 100 and the conveyor 18, and is passed from the upender 10 for downstream handling in the fully upended orientation.

Certain geometrical relationships between the upper and lower conveyors of the conveyor assemblies 12 and 14 will be evident. First, when an item 16 is engaged between a lateral rod 82 and a lateral slat 36, because the two conveyors are typically operated at different velocities, it is imperative that upending begin immediately or the item will be crushed. Also, it is evident that the vertical spacing between the conveyors of the upper conveyor assembly 12 and the lower conveyor assembly 14, when an item 16 has been upended, can only be commensurate with the length of the item 16, or the item 16 may be prematurely released before being fully upended. Also, as illustrated in FIG. 1 and as explained above, the inclined portion of the upper conveyor terminates before the item 16 is fully upended. It will be evident that, depending on the relative velocities of the conveyors of the upper and lower conveyor assemblies, the apparatus can be formed such that an item is fully upended before the upper conveyor returns to the horizontal, and the horizontal portion of the conveyor can be omitted. For stability, however, it is preferred that a short horizontal component of motion be provided thereafter, as illustrated in FIGS. 1 and 1A.

For items shorter than those illustrated in FIG. 1, the framework 78 is lowered as shown in FIG. 1A, and the chains 68 are then oriented at a less steep angle in relation to the conveyor 18. In the lowest orientation as shown in FIG. 1A, short rolls can be upended. By simple adjustment of the relative pitches of the conveyors of the upper and lower conveyor assemblies 12 and 14, the relative positions of the lateral slats 36 and lateral rods 82 can be adjusted for the varying lengths of different products to be upended.

As shown in FIG. 1, the item 16 to be upended is of sufficient length that it is longer than the distance between succeeding lateral slats 36. Therefore, every other lateral slat 36 is inhibited from being raised by simply sliding the cam followers 48 to the withdrawn position shown in FIG. 3.

Upending of an item, in its simplest version, comprises engaging an item at opposite ends and then raising one of the ends through an arcuate path which is followed by the one end as it is transferred from the prone orientation to the upright orientation. That relationship always remains when one end is upended, in that because the length of an upended item is fixed, the arcuate path through 90° is a geometrical requirement.

When an item is upended, the lateral slat 36 and rod 82 between which the item is engaged fall in generally the same vertical plane when the item is in the upright orientation. Depending on the relative positions of engagement of an item, the plane at the instant that an item is upended may not be fully vertical, as illustrated in the right-hand orientation in FIG. 1 where the rod 82 is vertically above, but not directly above, the slat 36 beneath the item 16.

The invention has been described in relation to raising and lowering of the slat 36. It will be evident that in other configurations of the apparatus according to the invention, other means for articulating one or both of the slat 36 and rod 82 can be employed to release an item from engagement between the rod 82 and slat 36 when the item is in the upright orientation.

As described above, it is preferred that the two conveyors of the upper conveyor assembly 12 and the lower conveyor assembly 14 be driven directly by the interconnecting chain assemblies 92 and 94. Other means for driving the conveyors in a timed relationship can be used as well so that an item 16, when first engaged between an upstream raised slat 36 and downstream rod 82 is so-engaged immediately prior to commencement of upending of the item.

Achievements

The present invention is a substantial improvement over prior art upending devices and processes. The upender 10 can be driven in a continuous motion, thus continuously accepting items in a prone orientation, and releasing them in an upright orientation for downstream processing. Due to the geometry of the upender 10, a very large range of sizes of items 16 can be accommodated by adjustment of a very few parts. By raising or lowering the elevating framework 78, and adjusting the conveyors of the upper and lower conveyor assemblies 12 and 14, many different sizes and types of products can be accommodated.

Several individual items 16 may be upended simultaneously, and the number of items which can be upended simultaneously is limited only by the width of the conveyors of the upper and lower conveyor assemblies 12 and 14. Thus, as shown in FIG. 5, individual items can be upended in a side-by-side relationship.

The flexibility provided by the elongated slot 88 of the housing 84 in combination with the flexible pressure link introduces a built-in "forgiveness" in the upender 10. Not only can items 16 with minor variations in length be accommodated, but also the desired fixed distanced between a raised slat 36 and a lateral rod 82 during upending can be retained by movement of the rod 82 within the slot 88.

Various changes can be made to the invention without departing from the spirit thereof or scope of the following claims. In particular, upending can be read to include rotating an item 90° in the horizontal plane or any angle between horizontal and vertical. Those skilled in the art will appreciate other changes or modifications, as well. For example, although it is preferred that the lower conveyor be driven at a greater velocity than the upper conveyor, and the downstream end of the item be engaged by the upper conveyor and the upstream end be engaged by the lower conveyor, the opposite can occur. Thus, the upper conveyor may be driven at a greater velocity with the upstream end engaged by the upper conveyor and the downstream end engaged by the lower conveyor. Other variations can also occur.

What is claimed is:

1. An apparatus for conveying and upending an item from a prone orientation to an upright orientation, comprising
  a. first means for engaging one end of the item at a first location, said first engaging means being carried by a first forward moving conveyor travelling a generally horizontal path,
  b. second means for engaging a second end of the item opposite to said one end, said second engaging means being carried by a second forward moving conveyor, said second forward moving having a path of travel defined by a first inclined portion and a second horizontal portion downstream of said first inclined portion,
  c. means for spacing said second horizontal portion above said first forward moving conveyor such that said first and second engaging means are spaced a distance substantially equal to the height of the item being upended,
  d. means for guiding said second forward moving conveyor through said path of travel, and
  e. means for driving said conveyors in a timed relationship.

2. An upending apparatus according to claim 1 in which said first engaging means comprises a lateral slat in said first conveyor, and in which said means for articulating comprises means for raising said slat.

3. An upending apparatus according to claim 2 in which said means for raising comprises a cam follower carried by said slat and a fixed cam located to be traversed by said cam follower.

4. An upending apparatus according to claim 3 including means for inhibiting engagement of said cam follower on said cam to prevent raising of said slat.

5. An upending apparatus according to claim 4 in which said cam comprises an elongated track and said cam follower comprises a slide secured to said slat.

6. An upending apparatus according to claim 5 including an indentation in said slat in registration with said fixed cam, said slide in a normal position being oriented to bridge said indentation, and in which said means for inhibiting comprises means mounting said slide for lateral translation to a withdrawn position to expose said indentation.

7. An upending apparatus according to claim 6 in which said mounting means comprises a flange on said slide engaging a lateral groove in said slat and including means for temporarily holding said slide in said normal and withdrawn positions.

8. An upending apparatus according to claim 2 including means for biasing said slat in an unraised orientation.

9. An upending apparatus according to claim 8 in which said slat includes a fixed portion and an elevating portion, and in which said biasing means comprises a spring bearing between said fixed and elevating portions.

10. An upending apparatus according to claim 1 in which said second engaging means comprises a lateral rod.

11. An upending apparatus according to claim 10 including means flexibly mounting said rod in said second conveyor.

12. An upending apparatus according to claim 11 in which said means flexibly mounting comprises a housing secured to said second conveyor for each end of said rod, each housing having an elongated slot formed therein and engaging a rod end, and including means biasing said rod end in said slot.

13. An upending apparatus according to claim 12 in which said biasing means comprises a flexible pressure link secured to said housing and to said rod and urging said rod end toward one end of said slot.

14. An apparatus for conveying and upending an item from a prone orientation to an upright orientation, comprising
   a. first means for engaging one end of the item at a first location, said first engaging means being carried by a first forward moving conveyor travelling a generally horizontal path,
   b. second means for engaging a second end of the item opposite to said one end, said second engaging means being carried by a second forward moving conveyor, said first and second engaging means being located relative to one another to raise one end of a said item relative to the other end of the item,
   c. one of said engaging means including a plurality of spaced engaging members, and including means for selectively moving said engaging members into and out of engagement with an item, and
   d. means for driving said conveyors in a timed relationship.

15. An upending apparatus according to claim 14 in which said first engaging means includes said engaging members, each engaging member comprising a lateral slat in said first conveyor, and in which said means for selectively moving includes means for raising said slat.

16. An upending apparatus according to claim 15 in which said means for raising comprises a cam follower carried by said slat and a fixed cam located to be traversed by said cam follower.

17. An upending apparatus according to claim 16 including means for inhibiting engagement of said cam follower on said cam to prevent raising of said slat.

18. An upending apparatus according to claim 17 in which said cam comprises an elongated track and said cam follower comprises a slide secured to said slat.

19. An upending apparatus according to claim 18 including an indentation in said slat in registration with said fixed cam, s id slide in a normal position being oriented to bridge said indentation, and in which said means for inhibiting comprises means mounting said slide for lateral translation to a withdrawn position to expose said indentation.

20. An upending apparatus according to claim 19 in which said mounting means comprises a flange on said slide engaging a lateral groove in said slat, and including means for temporarily holding said slide in said normal and withdrawn positions.

21. An upending apparatus according to claim 15 including means for biasing said slat in an unraised orientation.

22. An upending apparatus according to claim 21 in which said slat includes a fixed portion and an elevating portion, and in which said biasing means comprises a spring bearing between said fixed and elevating portions.

23. An upending apparatus according to claim 14 in which said second engaging means comprises a lateral rod.

24. An upending apparatus according to claim 23 including means flexibly mounting said rod in said second conveyor.

25. An upending apparatus according to claim 24 in which said means flexibly mounting comprises a housing secured to said second conveyor for each of said rod, each housing having an elongated slot formed therein and engaging a rod end, and including means biasing said rod end in said slot.

26. An upending apparatus according to claim 25 in which said biasing means comprises a flexible pressure link secured to said housing and to said rod and urging said rod end toward one end of said slot.

27. An upending apparatus according to claim 14 in which each conveyor includes at least one sprocket wheel, and said driving means comprises means interlinking said sprocket wheels.

28. An upending apparatus according to claim 14 in which said velocities are unequal.

29. An upending apparatus according to claim 14 in which at least a portion of said second conveyor is mounted at an angle relative to said first conveyor such that separation between said conveyors increases in a downstream direction.

30. An upending apparatus according to claim 29 including means for changing said angle to upend items of varying lengths.

31. An upending apparatus according to claim 1 including means for articulating one of the engaging means in order to release the item from engagement when the item is upended.

* * * * *